US010765090B2

(12) United States Patent
Izumo et al.

(10) Patent No.: US 10,765,090 B2
(45) Date of Patent: Sep. 8, 2020

(54) ANIMAL WEIGHING SCALE

(71) Applicant: A&D COMPANY, LIMITED, Tokyo (JP)

(72) Inventors: Naoto Izumo, Saitama (JP); Ken Ihara, Saitama (JP); Shunsuke Kasamatsu, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 491 days.

(21) Appl. No.: 15/559,964

(22) PCT Filed: Apr. 24, 2015

(86) PCT No.: PCT/JP2015/062508
§ 371 (c)(1),
(2) Date: Sep. 20, 2017

(87) PCT Pub. No.: WO2016/170675
PCT Pub. Date: Oct. 27, 2016

(65) Prior Publication Data
US 2018/0103617 A1    Apr. 19, 2018

(51) Int. Cl.
*A01K 29/00* (2006.01)
*A01K 1/03* (2006.01)
*G01G 17/08* (2006.01)
*G01G 17/00* (2006.01)
*G01G 21/28* (2006.01)

(52) U.S. Cl.
CPC ............ *A01K 29/00* (2013.01); *A01K 1/031* (2013.01); *G01G 17/00* (2013.01); *G01G 17/08* (2013.01); *G01G 21/28* (2013.01)

(58) Field of Classification Search
CPC ........ A01K 29/00; A01K 1/031; G01G 17/00; G01G 17/08; G01G 21/28
See application file for complete search history.

(56) References Cited

U.S. PATENT DOCUMENTS

2008/0196672 A1    8/2008  Mokhtarian et al.
2012/0299731 A1*  11/2012  Triener ............... A01K 29/005
                                                340/573.1

FOREIGN PATENT DOCUMENTS

DE    112007001080 B4 *   8/2017
JP          01035223 A     2/1989
JP         01-229915 A     9/1989
(Continued)

OTHER PUBLICATIONS

International Search Report and Written Opinion dated Jun. 2, 2015 in the corresponding application PCT/JP2015/062508.

*Primary Examiner* — Monica L Barlow
*Assistant Examiner* — Aaron M Rodziwicz
(74) *Attorney, Agent, or Firm* — Roberts Calderon Safran & Cole P.C.

(57) ABSTRACT

Provided is an animal weighing scale that automatically measures a weight of an animal by a simple configuration. The animal weighing scale includes a breeding container for laboratory animals and a scale including a weighing pan supported by a weight sensor, the weighing pan is disposed inside a breeding space of the breeding container, and the weight sensor is disposed inside or outside the breeding space, and accordingly, based on a measurement value change when an animal inside the container is placed onto the pan, a weight change of the animal can be continuously recorded.

8 Claims, 6 Drawing Sheets

(56) References Cited

FOREIGN PATENT DOCUMENTS

| | | | | |
|---|---|---|---|---|
| JP | 08-127490 | A | | 5/1996 |
| JP | 11-337389 | A | | 12/1999 |
| JP | 2002303572 | A | * | 10/2002 |
| JP | 2002-360097 | A | | 12/2002 |
| JP | 2003302324 | A | * | 10/2003 |
| JP | 2005-140626 | A | | 6/2005 |
| JP | 2005291765 | A | * | 10/2005 |
| JP | 2005308656 | A | * | 11/2005 |
| JP | 2006046912 | A | * | 2/2006 |
| JP | 2009300246 | A | * | 12/2009 |
| JP | 2010-223961 | A | | 10/2010 |
| JP | 2013137323 | A | * | 7/2013 |
| WO | WO-2007136031 | A1 | * | 11/2007 ........... G01G 23/005 |

* cited by examiner

ANIMAL WEIGHING SCALE

CROSS-REFERENCE TO RELATED APPLICATIONS

The present application is a U.S. National Phase of PCT/JP2015/062508 filed on Apr. 24, 2015. The disclosure of the PCT Application is hereby incorporated by reference into the present Application.

TECHNICAL FIELD

The present invention relates to an animal weighing scale to be used in animal experiments.

BACKGROUND ART

A laboratory animal such as a mouse or a rat is raised in an exclusive breeding container the environment in which is controlled. When an animal experiment is started, for observation of influences of dosage of a drug or poison, the weight of an animal is continuously measured. For this, a simple method in which an animal is taken out of the breeding container and put on a weighing scale and weighed has been adopted until now, however, this method gives, in addition to the aspects of labor and cost, risks of infection between an experimenter and an animal due to touching the animal by the experimenter and contact with hazardous substances, and a problem in which the animal is subjected to stress by contact with a human, and therefore, there is a demand for automating animal weight measurement.

In response to such demand, for example, in Patent Literatures 1 and 2, animal weight measurement is performed without touching an animal by using an apparatus arranged to have a breeding container automatically movable up and down on a weighing scale.

CITATION LIST

Patent Literatures

Patent Literature 1: Japanese Published Unexamined Patent Application No. H11-337389
Patent Literature 2: Japanese Published Unexamined Patent Application No. 2002-360097

SUMMARY OF THE INVENTION

Technical Problem

However, in the apparatuses shown in Patent Literatures 1 and 2, apparatus facilities increase in scale and experiment costs increase.

An object of the present invention is to provide an animal weighing scale to automatically measure the weight of an animal continuously for a long period of time by a simple configuration, to measure animal weight changes and the amount of movement of animals, and establish a behavior evaluation method including activity evaluation.

Solution to the Problem

In order to solve the above-described problem, an animal weighing scale according to the present invention includes a breeding container for laboratory animals and a scale including a weighing pan supported by a weight sensor, wherein the weighing pan is disposed inside a breeding space of the breeding container, and the weight sensor is disposed inside or outside the breeding space.

In an animal weighing scale according to an aspect of the present invention, the scale includes a pan supporting post to support the weighing pan, a bottom surface of the breeding space has a bottom surface opening through which the pan supporting post is inserted, the pan supporting post projects to the inside of the breeding space from the bottom surface of the breeding space, and the weighing pan is disposed inside the breeding space.

By disposing the weighing pan of the scale inside the breeding space, based on measurement value changes that occur when an animal inside the container placed onto the pan, weight changes and states of activity including the amount of movement of the animal can be continuously measured and recorded. In addition, weight changes of an animal can be automatically measured, so that an experimenter can safely measure weight transition of the animal without touching the animal, and weight changes and states of exercise of the animal, etc., can be measured under conditions where a breeding environment of the animal is kept in the breeding space, so that an experiment can be conducted without giving new stress to the animal. In addition, without needing an auxiliary device to move up and down, etc., the animal container on the scale, an accurate weight of an animal can be measured in chronological order by a simple configuration in which the weighing pan is placed in the breeding space. Further, by disposing a weight sensor outside the breeding space, contamination of a scale main body by excrement, etc., of the animal can be eliminated or reduced. Further, by cleaning and managing only the weighing pan or making the weighing pan disposable, cleaning around the scale becomes unnecessary.

In the aspect described above, it is also preferable that between the pan supporting post and the bottom surface opening, a circumferential wall surrounding the pan supporting post in the circumferential direction is formed, and an outer circumference of the circumferential wall substantially matches the bottom surface opening. By forming a circumferential wall on the pan supporting post serving as a joint portion between the weighing pan inside the breeding space and the weight sensor, the breeding container can be prevented from coming into contact and interfering with the pan supporting post and influencing a measurement value. In addition, by fitting and substantially matching the outer circumference of the circumferential wall with the bottom surface opening, the breeding container and the weighing scale can be positioned.

In the aspect described above, it is also preferable that between the circumferential wall and the bottom surface opening, a seal member is annularly disposed. When an experiment is started, the breeding space becomes a space the environment in which is controlled. When the scale is disposed outside the breeding space, a gap is formed around the bottom surface opening and may generate a new air flow passage different from an inlet and an outlet that enable air to flow into and out of the designed breeding space. On the other hand, in the configuration described above, by annularly sealing the portion between the circumferential wall and the bottom surface opening by the seal member, air other than environmentally controlled air can be prevented from flowing in and flowing out. When a gap exists between the circumferential wall and the bottom surface opening, feed and excreta may leak from this gap and enter the inside of the scale main body, however, by the seal member described above, contamination of the scale main body can also be prevented.

In the aspect described above, it is also preferable that between the circumferential wall and the pan supporting post, a diaphragm-shaped second seal member is disposed. By disposing the second seal member between the circumferential wall and the pan supporting post as well, the problem of flowing-in and flowing-out of air described above and the problem of contamination expansion to the inside of the scale main body can be prevented. In addition, by selecting a diaphragm-shaped seal member as the second seal member, the second seal member does not interfere with movement of the pan supporting post, so that influence on a measurement value can be reduced.

In the aspect described above, it is also preferable that at least a base end portion side of the circumferential wall is formed to increase in diameter downward. In addition to the seal member described above, by inclining the circumferential wall that serves as an outer circumferential structure of the pan supporting post, feed and excreta can be further prevented from leaking to the inside of the scale main body.

In the aspect described above, it is also preferable that the breeding container is supported by a support member that supports a weight of the entire breeding container. It is also preferable that the support member is a case that can contain the scale, and has a case hole that corresponds to the bottom surface opening and is formed in a case upper surface. Alternatively, it is also preferable that the support member is formed on a floor surface on which the scale is disposed and/or a main body upper surface of the scale. Accordingly, the breeding container is supported by the support member that supports the weight of the entire breeding container, and all of the weight that includes the weight of the breeding container itself and weights of feed, water, and breeding materials, etc., are also received by the support member, therefore the weighing scale can be arranged so as not to measure a weight other than weights of things placed on the weighing pan.

In the aspect described above, it is also preferable that weighing data from the weight sensor is output by a radio transmitter to analyzation equipment, and the radio transmitter is fixed to a side surface of the case.

Advantageous Effects of Invention

By the animal weighing scale according to the present invention, a weight of an animal can be automatically measured with a simple configuration.

DESCRIPTION OF EMBODIMENTS

Next, preferred embodiments of the present invention are described with reference to the drawings.

First Embodiment

Figure 1:
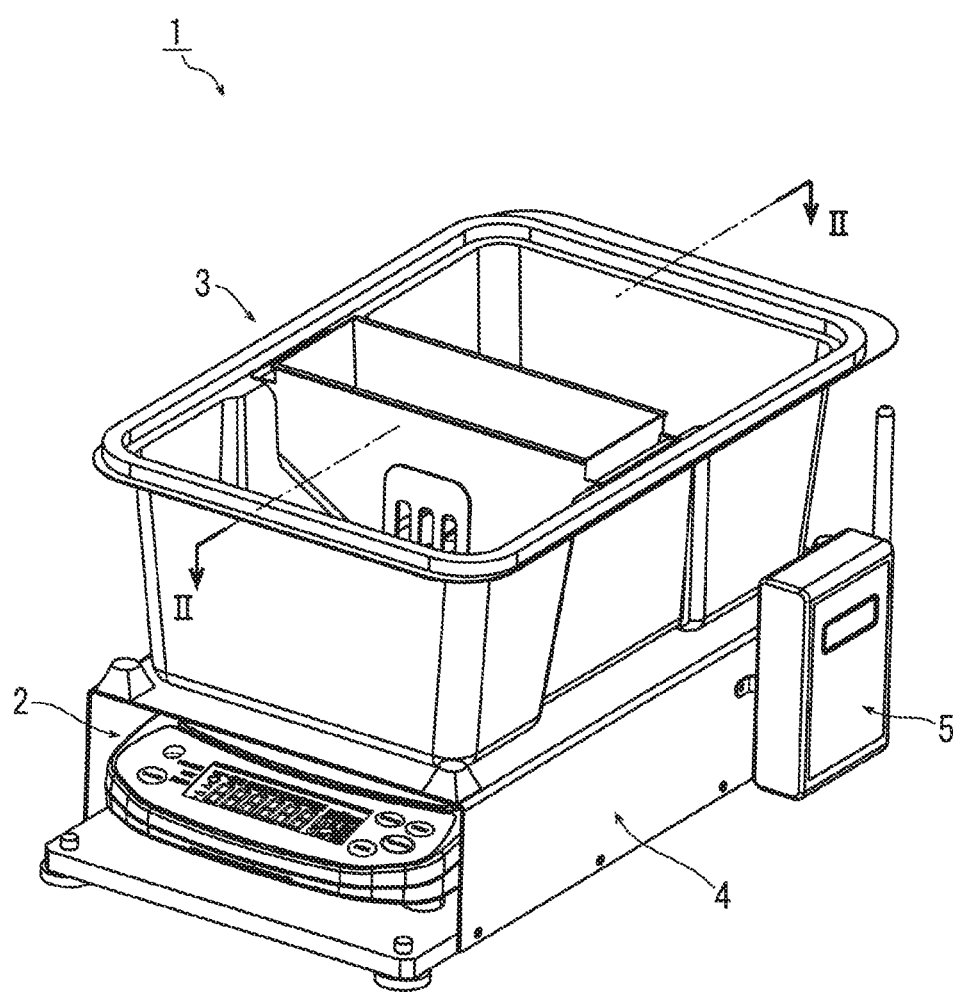
FIG. 1 is a configuration diagram of an animal weighing scale according to a first embodiment.

As shown in FIG. 1, an animal weighing scale 1 of the present embodiment includes a scale 2, a breeding container 3, a support case 4, and a radio transmitter 5.

Figure 2:
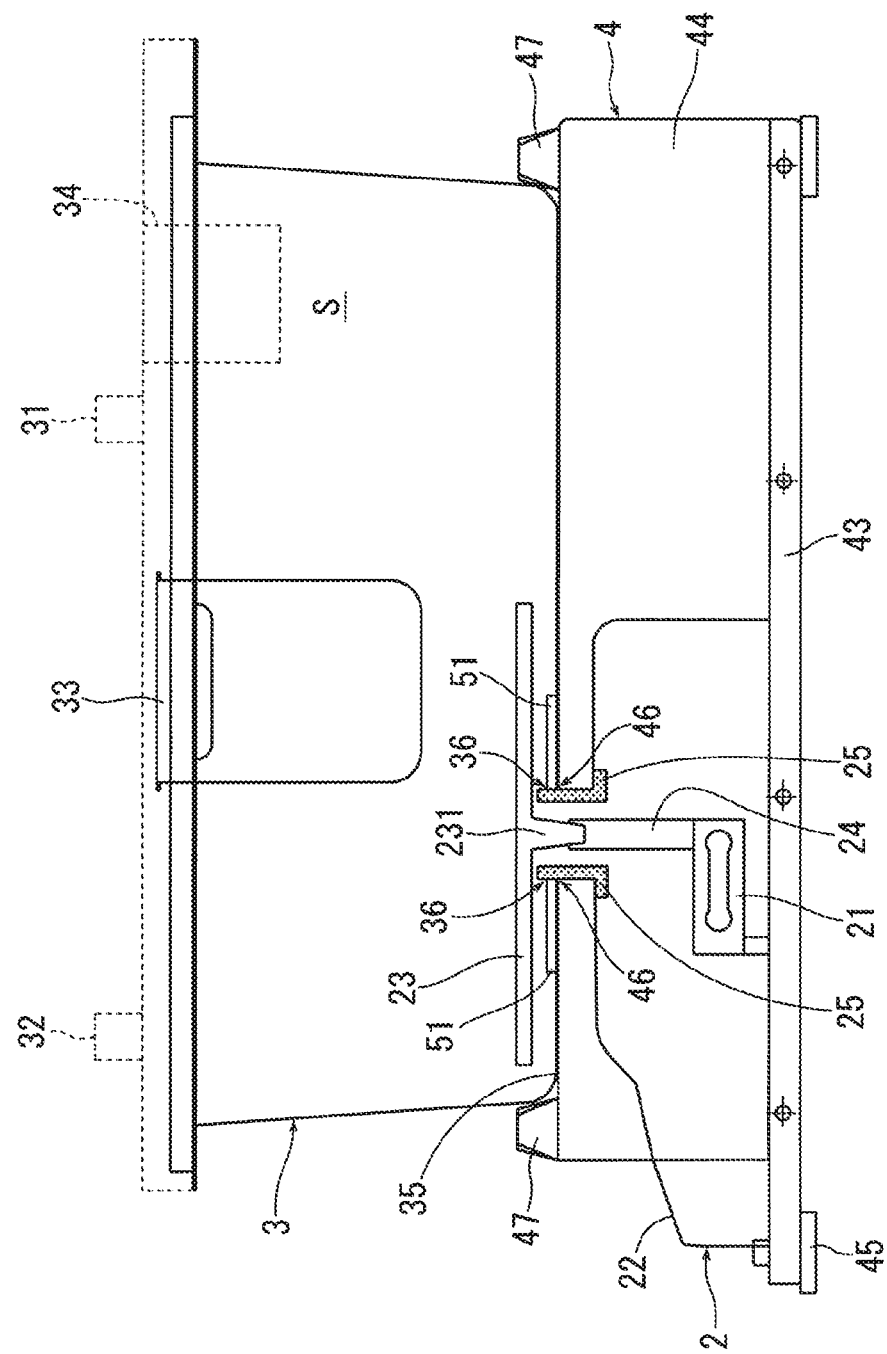
FIG. 2 is a longitudinal sectional view of FIG. 1.

As shown in FIG. 2, the scale 2 includes a main body case 22 housed a weight sensor 21, a weighing pan 23, a pan supporting post 24, and a circumferential wall 25.

The weight sensor 21 may be an electromagnetic balance type, a strain gauge type, a capacitance type, etc., as long as measurement data of an object placed on the weighing pan 23 can be obtained. As a weight sensor 21, a weight sensor with a weighing capacity, a minimum display (measurement value reading accuracy), and strength performance corresponding to a weight of an animal as an object of experiment can be appropriately selected. The performance of the weight sensor 21 can be determined as follows. Considering that a measurement value is not stable due to a fluctuation of the center of gravity based on the fact that a human having a weight of 60 kg has a fluctuation of the center of gravity of 1 to 10 g in a stationary state, for example, when a mouse having a weight of 30 g is observed, the movement of the center of gravity is calculated from the proportional expression: 60000 g:10 g=30 g:x g, as x=5 mg. Thus, it can be determined that use of a scale with a weighing capacity of 3 kg and a minimum display of 1 to 10 mg is preferable.

The pan supporting post 24 is a hollow member that joins the weighing pan 23 and the weight sensor 21, and is fixed to the weight sensor 21 and extends upward in the vertical direction from the weight sensor 21. In terms of joining the weighing pan and the weight sensor, a member corresponding to the pan supporting post is also provided in a configuration of a conventional scale, however, the pan supporting post 24 of the present embodiment is characterized by having a necessary length (height) set to project the weighing pan 23 to the inside of the breeding container 3.

The weighing pan 23 has a pan boss 231 protruding downward at a lower surface center position of the pan. The weighing pan 23 is positioned by inserting the pan boss 231 into the pan supporting post 24, and is supported from below by the pan supporting post 24.

Figure 3:
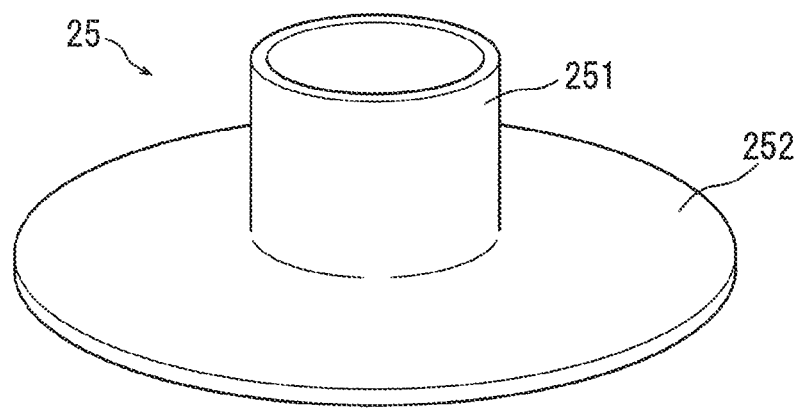
FIG. 3 is a perspective view showing a circumferential wall shown in FIG. 1.

The circumferential wall 25 has, as shown in FIG. 3, a vertical portion 251 and a horizontal portion 252. The vertical portion 251 is a hollow portion surrounding the pan supporting post 24 projecting from the main body case 22 in the circumferential direction. The horizontal portion 252 is a base portion of the vertical portion 251, and is fixed to an upper surface of the main body case 22 or a recessed portion, etc., set on the upper surface.

Next, the breeding container 3 includes, as shown in FIG. 2, an air inlet 31, an air outlet 32, a feeding portion 33, and a water supply portion 34, etc. In the present embodiment, the entirety of the inside of the breeding container 3 serves as a breeding space S. In a container bottom surface (bottom surface of the breeding space) 35, a bottom surface opening 36 through which the pan supporting post 24 and the circumferential wall 25 are inserted is formed. The shape (diameter) of the bottom surface opening 36 substantially matches an outer diameter of the circumferential wall 25.

In addition, in preparation for flowing in and flowing out of environmentally controlled air, in the breeding container 3, an annular seal member 51 is disposed to eliminate a gap that may be formed between the outer circumference of the circumferential wall 25 and the inner circumference of the bottom surface opening 36. As the seal member 51, a diaphragm or an O-ring, etc., may be used, and is fitted to surround the outer circumference of the circumferential wall 25 inside the breeding container 3 as shown in FIG. 2.

The breeding container 3 is supported from below by the support case (support member) 4 as shown in FIG. 1 and FIG. 2. The support case 4 includes a base portion 43 and a case portion 44. The support case 4 has an opening on the front side, and through the opening, the scale 2 can be operated. The base portion 43 is provided with leg tops 45 for height adjustment. In an upper surface of the case portion 44, at a position corresponding to the bottom surface opening 36 of the breeding container 3, a case hole 46 is formed. The shape (diameter) of the case hole 46 only requires the pan supporting post 24 from the scale 2 and the circumferential wall 25 to be inserted therein, and may be larger than the outer diameter of the circumferential wall 25 since airtightness is secured by the seal member 51. At four corners of the upper surface of the case portion 44, positioning projections 47 are formed to substantially position the breeding container 3.

On the support case 4, the radio transmitter 5 is installed. Measurement data detected by the weight sensor 21 is converted into a measurement value by a CPU inside the scale 2, output to the radio transmitter 5 via an RS-232C cable, and output to analyzation equipment such as a personal computer (hereinafter, referred to as PC) by radio. The analyzation equipment may be general-purpose analyzation equipment with a CPU, a ROM, and a RAM, etc. The analyzation equipment continuously records measurement values output from the scale 2.

According to the animal weighing scale 1 described above, the weighing pan 23 is disposed inside the breeding container 3 (breeding space S), and the weight sensor 21 is disposed outside the breeding container 3 (breeding space S). The breeding container 3 is supported by the support case 4, therefore, all of the weight that includes the weight of the breeding container 3 itself and weights of feed, water, and others such as breeding paper, etc., are received by the support case 4, so that a weight other than the weights of objects placed on the weighing pan 23 is not measured. Therefore, based on a measurement value change when an animal is placed onto the weighing pan 23 disposed inside the breeding container 3, a weight change or the amount of movement of the animal can be continuously measured and recorded.

By using this animal weighing scale 1, a weight change of an animal can be automatically measured, so that an experimenter does not come into contact with the animal, and is safe from infection and contamination. In addition, weight measurement can be performed while keeping an animal breeding environment, so that an experiment can be conducted without giving stress to the animal by a measurement operation. In addition, since a weight of an animal is measured based on a measurement value change when the animal inside the container is placed onto the weighing pan 23, a design of the breeding container 3 in which the feeding portion 33 and the water supply portion 34 are installed near the weighing pan 23, and a design in which an inclined portion or a step portion to eliminate a difference in level between the weighing pan 23 and the container bottom surface 35 is formed or disposed in the breeding container 3 so that an animal is placed onto the weighing pan 23, are also preferable.

This animal weighing scale 1 does not need a large-scale auxiliary device to move up and down, etc., the breeding container 3, and by a simple configuration in which the weighing pan 23 is disposed inside the breeding container (breeding space S), animal weight measurement can be realized.

Further, by cleaning and managing only the weighing pan 23 or making the weighing pan 23 disposable, cleaning around the scale 2 becomes unnecessary, so that experiment costs can also be reduced.

Since the weight sensor 21 is disposed outside the breeding container 3 (outside the breeding space S), contamination of the inside of the main body of the scale 2 (the inside of the main body case 22 including the weight sensor 21, etc.) can be eliminated or reduced.

By forming the circumferential wall 25 on the pan supporting post 24 serving as a joint portion between the weighing pan 23 inside the breeding container 3 and the weight sensor 21, the breeding container 3 can be prevented from coming into contact and interfering with the pan supporting post 24 and influencing a measurement value. By substantially matching the outer circumference of the circumferential wall 25 with the bottom surface opening 36, the breeding container 3 and the scale 2 can be positioned.

When an experiment is started, in some cases, the inside of the breeding container 3 is made to be an enclosed space by introducing environmentally controlled air in the inside of the breeding container 3 from the air inlet 31 and discharging the air from the air outlet 32. In the animal weighing scale 1 of the present embodiment, the bottom surface opening 36 is provided in order to dispose the scale 2 outside the breeding container 3, and this gap may cause a new air flow. On the other hand, by annularly sealing the portion between the circumferential wall 25 and the bottom surface opening 36 by the seal member 51, flowing-in and flowing-out of air other than the environmentally controlled air can be prevented. If a gap exists around the bottom surface opening 36, feed and excreta may leak from this gap and enter the inside of the main body of the scale 2, however, the seal member 51 can also prevent this contamination. A scale 2 with a main body having a conventionally known waterproof structure may be used.

Figure 4:
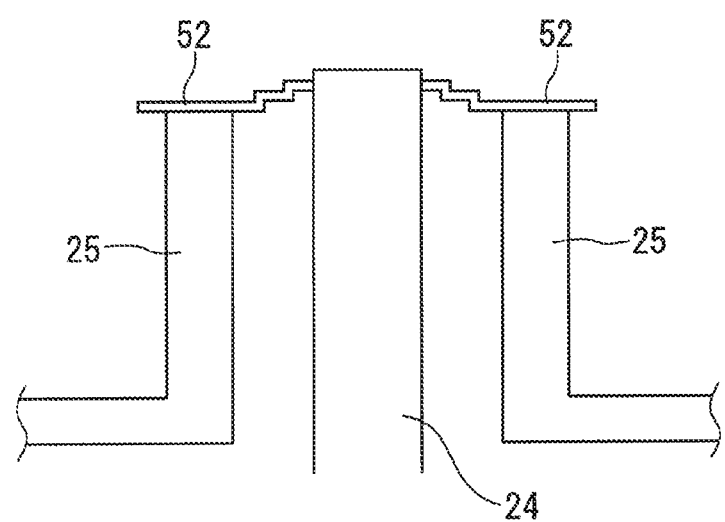
FIG. 4 is an essential portion sectional view showing an example in which a second seal member is disposed in FIG. 1.

Next, a preferred modification of the periphery of the circumferential wall 25 is shown. As shown in FIG. 4, in this case of the circumferential wall 25, between the circumferential wall 25 and the pan supporting post 24, a diaphragm-shaped second seal member 52 is annularly disposed. Counterplan of the bottom surface opening 36 is made by the seal member 51, however, strictly, it is preferable to seal the portion between the circumferential wall 25 and the pan supporting post 24 as well. Therefore, by disposing the second seal member 52 between the circumferential wall 25 and the pan supporting post 24 as well, the problem of flowing-in and flowing-out of air and the problem of contamination inside the scale 2 can be further prevented. By selecting a diaphragm-shaped seal member as the second seal member 52, the second seal member 52 can be prevented from interfering with movement of the pan supporting post 24 when the pan supporting post 24 receives a load, and influence on a measurement value can be reduced.

Figure 5:
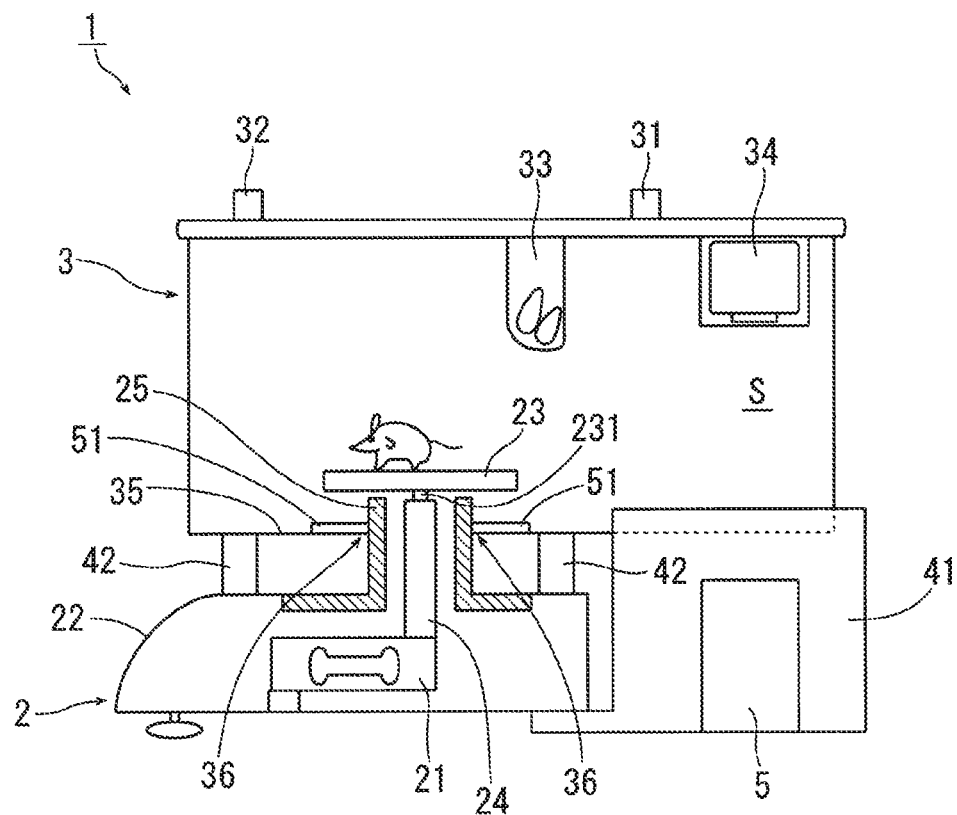
FIG. 5 is a modification of a support member shown in FIG. 1.
Figure 6:
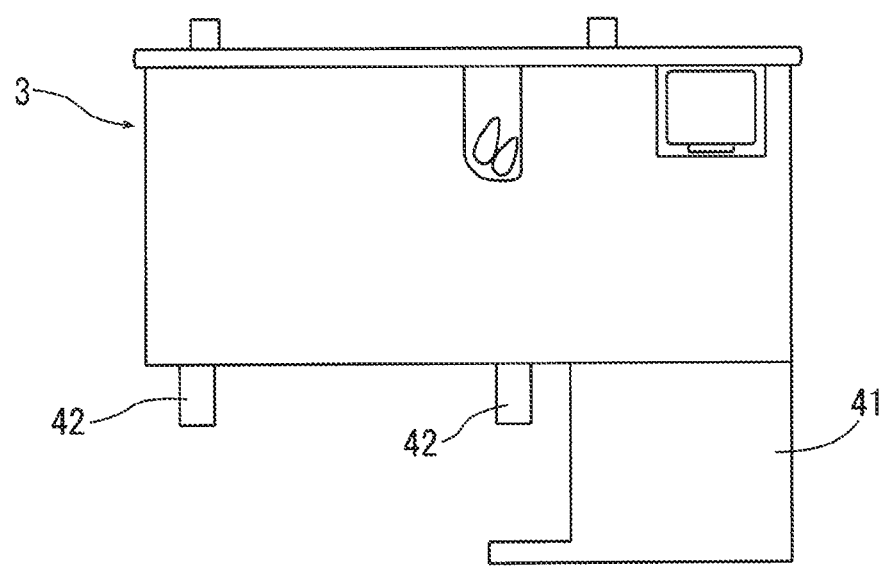
FIG. 6 is another modification of a support member shown in FIG. 1.

Next, preferred modifications of the support member are described. As shown in FIG. 5, the breeding container 3 is supported from below by a supporting base 41 and supporting projections 42. The supporting base 41 is disposed on a floor surface on which the scale 2 is disposed and supports the breeding container 3. The supporting projections 42 are formed on an upper surface of the main body case 22 and support the breeding container 3. Either one of the supporting base 41 and the supporting projections 42 may be provided as long as the supporting base 41 or the supporting projections 42 can support the weight of the entire breeding container 3. The numbers, positions, and strengths, etc., of the supporting base 41 and the supporting projections 42 may be arbitrarily designed according to a target animal or the manner of an experiment. The supporting projections 42 may be formed integrally with the upper surface of the main body case 22, or may be fixed as separate members to the upper surface of the main body case 22. Alternatively, the supporting base 41 and the supporting projections 42 may be formed integrally with the breeding container 3 as shown in FIG. 6.

Second Embodiment

Figure 7:
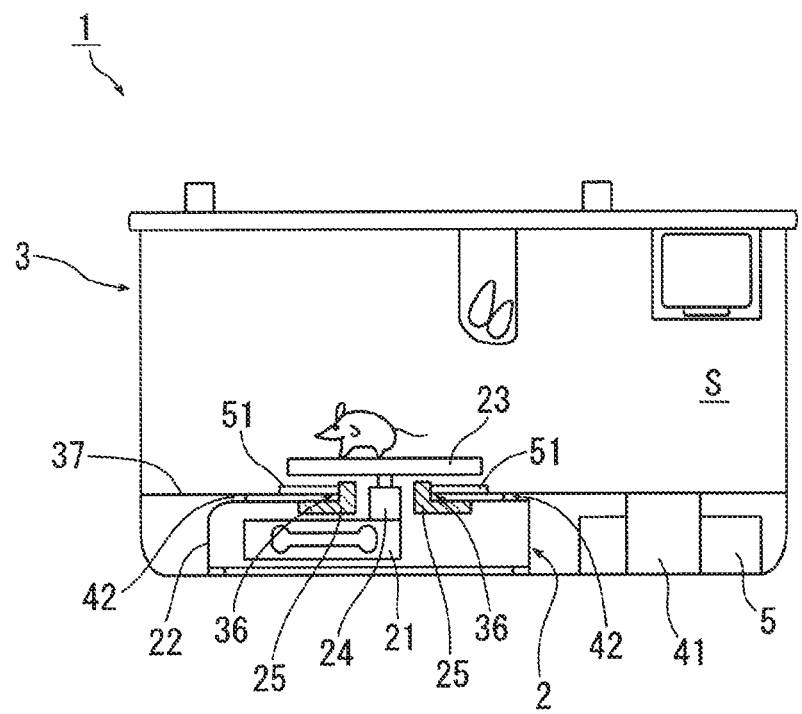
FIG. 7 is a configuration diagram of an animal weighing scale according to a second embodiment.

In the present embodiment, description of the same components as in the first embodiment is omitted by using the same reference signs. In an animal weighing scale 1 according to the present embodiment, as shown in FIG. 7, a horizontal partition plate 37 is added in the breeding container 3, and the main body (the main body case 22 including the weight sensor 21) of the scale 2 is disposed inside the breeding container 3. In the present embodiment, the area higher than the partition plate 37 serves as the breeding space S, and the partition plate 37 serves as a bottom surface of the breeding space. The animal weighing scale 1 according to the present embodiment includes a pan supporting post 24 with a necessary length (height) set to project the weighing pan 23 to the inside of the breeding space S, a circumferential wall 25 surrounding the pan supporting post 24 in the circumferential direction, and an annular seal member 51 surrounding the outer circumference of the circumferential wall 25. In the partition plate 37, a bottom surface opening 36 is formed, and the partition plate 37 is supported from below by supporting projections 42 and/or a supporting base 41. Accordingly, the weighing pan 23 is disposed inside the breeding space S, and the main body case 22 including the weight sensor 21 is disposed outside the breeding case S. In a space lower than the partition plate 37, a radio transmitter 5 is installed. Measurement data detected by the weight sensor 21 is output to the radio transmitter 5 via an RS-232C cable, and output to analyzation equipment by radio.

Thus, even when the scale 2 is disposed inside the breeding container 3, a weight change of an animal can be automatically measured as in the case of the first embodiment. By isolating the weight sensor 21 from the breeding space S by the partition plate 37, as in the case of the first embodiment, the problems of contamination and air flowing-in and flowing-out of the inside of the main body of the scale 2 can also be prevented.

Third Embodiment

Figure 8:
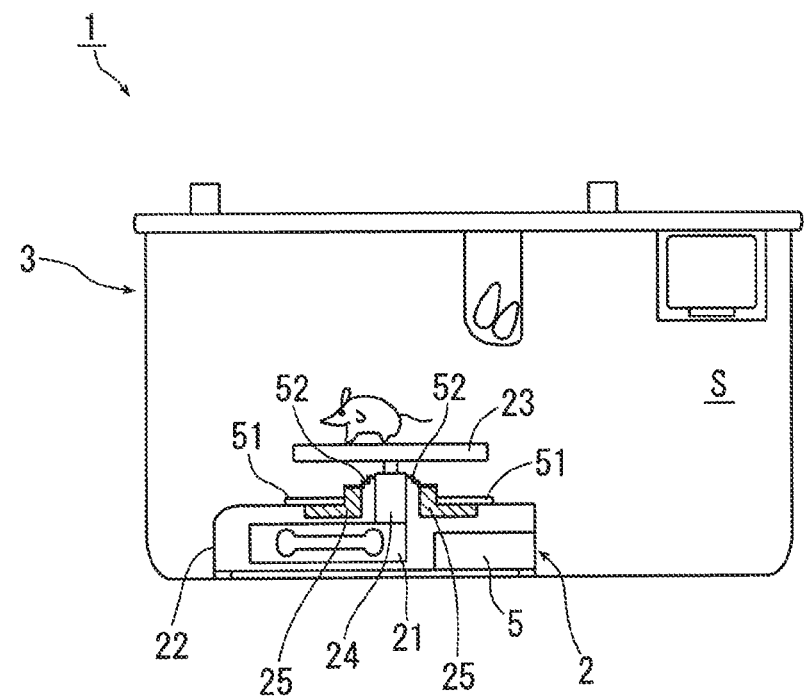
FIG. 8 is a configuration diagram of an animal weighing scale according to a third embodiment.

An animal weighing scale 1 according to the present embodiment is an example in which the main body of the scale 2 is disposed inside the breeding container 3 without using the partition plate 37 used in the second embodiment. In the present embodiment, as shown in FIG. 8, the main body case 22 including the weighing pan 23 and the weight sensor 21 is disposed inside the breeding space S. In the present embodiment, in the breeding space S, the bottom surface opening 36 does not exist, however, to prevent feed and excreta from leaking to the inside of the main body of the scale 2, a circumferential wall 25 surrounding the pan supporting post 24 in the circumferential direction and an annular seal member 51 surrounding the outer circumference of the circumferential wall 25 are preferably disposed. Further, since the weight sensor 21 is disposed inside the breeding space S, a second seal member 52 is preferably disposed between the circumferential wall 25 and the pan supporting post 24. The radio transmitter 5 is preferably installed inside the main body case 22 and makes an output to analyzation equipment by radio.

Thus, even when the entire scale 2 is disposed inside the breeding space S, as in the case of the first embodiment, a weight change of an animal can be automatically measured. In addition, even when the main body of the scale 2 is disposed inside the breeding space S without providing the partition plate 37, the same effects as in the first embodiment can be obtained as long as the problem of leakage of feed and excreta to the inside of the main body of the scale 2 is prevented.

Figure 9:
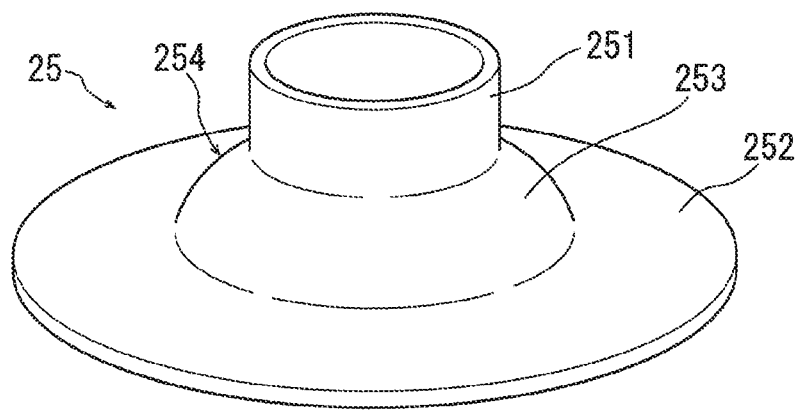
FIG. 9 is a modification of the circumferential wall shown in FIG. 3.

Next, a preferred modification of the circumferential wall 25, effective in the embodiments shown in FIG. 5 and FIG. 7, is shown. As shown in FIG. 9, the circumferential wall 25 in this case has a bulge portion 253 on the base end portion side of the vertical portion 251. The bulge portion 253 is formed into a paraboloid so that its diameter increases downward. Thus, in addition to by making the pan supporting post 24 project to the inside of the breeding container 3 and disposing the seal member 51 described above, by inclining the circumferential wall 25 serving as an outer circumferential structure of the pan supporting post 24, feed and excreta can be further prevented from leaking to the main body of the scale 2. In addition, by gradually inclining an upper portion 254 of the bulge portion 253, the upper portion 254 can also receive a load of the breeding container 3.

Although preferred embodiments and modifications of the present invention are described above, these are examples of the present invention, and the respective embodiments and the respective modifications can be combined based on knowledge of a person skilled in the art, and such a combined embodiment shall be included in the scope of the present invention.

REFERENCE SIGNS LIST

1 Animal weighing scale
2 Scale
3 Breeding container
4 Support case (support member)
5 Radio transmitter
21 Weight sensor
22 Main body case
23 Weighing pan
24 Pan supporting post
25 Circumferential wall
35 Container bottom surface (bottom surface of breeding space)
36 Bottom surface opening
37 Partition plate (bottom surface of breeding space)
41 Supporting base (support member)
42 Supporting projection (support member)
43 Base portion (support member)
44 Case portion (support member)

51 Seal member
52 Second seal member
S Breeding space

The invention claimed is:

1. An animal weighing scale comprising:
a breeding container for laboratory animals; and
a scale including a weighing pan supported by a weight sensor,
wherein the scale includes
a pan supporting post to support the weighing pan,
a bottom surface of a breeding space of the breeding container has a bottom surface opening through which the pan supporting post is inserted,
the pan supporting post projects to the inside of the breeding space from the bottom surface of the breeding space,
the weighing pan is disposed inside the breeding space,
the weight sensor is disposed outside the breeding space, and
between the pan supporting post and the bottom surface opening, a circumferential wall surrounding the pan supporting post in the circumferential direction is formed, and an outer circumference of the circumferential wall substantially matches the bottom surface opening.

2. The animal weighing scale according to claim 1,
wherein between the circumferential wall and the bottom surface opening, a seal member is annularly disposed.

3. The animal weighing scale according to claim 2,
wherein between the circumferential wall and the pan supporting post, a diaphragm-shaped second seal member is disposed.

4. The animal weighing scale according to claim 2,
wherein at least a base end portion side of the circumferential wall is formed to increase in diameter downward.

5. The animal weighing scale according to claim 1,
wherein the breeding container is supported by a support member that supports a weight of the entire breeding container.

6. The animal weighing scale according to claim 5,
wherein the support member is a case that contains the scale, and has a case hole that corresponds to the bottom surface opening and is formed in an upper surface of the case.

7. The animal weighing scale according to claim 5,
wherein the support member is formed on a floor surface on which the scale is disposed and/or an upper surface of a main body of the scale.

8. The animal weighing scale according to claim 6,
wherein measurement data from the weight sensor is output by a radio transmitter to analyzation equipment, and the radio transmitter is fixed to a side surface of the case.

* * * * *